(12) United States Patent
Augustine (10) Patent No.: US 9,652,447 B2
(45) Date of Patent: May 16, 2017

(54) POPULATING DOCUMENTS WITH USER-RELATED INFORMATION

(75) Inventor: Matthew Augustine, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 708 days.

(21) Appl. No.: 12/961,698

(22) Filed: Dec. 7, 2010

(65) Prior Publication Data

US 2012/0143958 A1 Jun. 7, 2012

(51) Int. Cl.

| | |
|---|---|
| *G06F 15/16* | (2006.01) |
| *G06F 17/24* | (2006.01) |
| *H04L 12/58* | (2006.01) |
| *G06Q 10/10* | (2012.01) |
| *G06F 17/21* | (2006.01) |
| *G06Q 10/06* | (2012.01) |

(52) U.S. Cl.
CPC .......... *G06F 17/248* (2013.01); *G06F 17/211* (2013.01); *G06Q 10/06* (2013.01); *G06Q 10/10* (2013.01); *H04L 51/32* (2013.01)

(58) Field of Classification Search
None
See application file for complete search history.

(56) References Cited

U.S. PATENT DOCUMENTS

| | | | | |
|---|---|---|---|---|
| 8,280,959 | B1 * | 10/2012 | Zuckerberg et al. | 709/204 |
| 8,346,776 | B2 * | 1/2013 | Bird et al. | 707/740 |
| 2005/0183035 | A1 * | 8/2005 | Ringel et al. | 715/811 |
| 2006/0004914 | A1 * | 1/2006 | Kelly et al. | 709/219 |
| 2006/0069596 | A1 | 3/2006 | Hatoun et al. | |
| 2008/0133445 | A1 | 6/2008 | Pennington | |
| 2008/0189395 | A1 | 8/2008 | Stremel et al. | |
| 2008/0288239 | A1 * | 11/2008 | Bailey et al. | 704/2 |
| 2009/0151002 | A1 | 6/2009 | Zuniga et al. | |
| 2010/0132049 | A1 * | 5/2010 | Vernal et al. | 726/27 |
| 2010/0241611 | A1 | 9/2010 | Zuber | |
| 2011/0099464 | A1 * | 4/2011 | Marashi et al. | 715/208 |

OTHER PUBLICATIONS

Damaster, "Docs.com Update adds tags support, search, sort and filter, and new Social Doc Templates", Retrieved at<<http://www.liveside.net/main/archive/2010/08/26/docs-com-update-adds-tags-support-search-sort-and-filter-and-new-social-doc-templates.aspx>>, Aug. 26, 2010, pp. 4.
Roe, David, "Document Management Roll-up: Microsoft, Facebook Release Docs.com, SharePoint Gets Doc Capture", Retrieved at<<http://www.cmswire.com/cms/document-management/document-management-rollup-microsoft-facebook-release-docscom-sharepoint-gets-doc-capture-008026.php>>, Jul. 13, 2010, pp. 2-5.
"Scribd : Linking & Branding via Document Sharing", Retrieved at<<http://www.searchenginejournal.com/scribd-document-sharing/13029/>>, Sep. 10, 2009, pp. 11.

* cited by examiner

*Primary Examiner* — Richard G Keehn
(74) *Attorney, Agent, or Firm* — Schwabe, Williamson & Wyatt P.C.

(57) ABSTRACT

One or more techniques and/or systems are disclosed for generating a document pre-populated with user-based information. A user's authorized social network can be mined for user-based information. The user-based information mined from the user-authorized social network can be added to a document template at locations in the template of one or more information identifiers in order to generate the pre-populated document. The one or more information identifiers can be used to identify the user-based information on the user authorized social network.

18 Claims, 8 Drawing Sheets

POPULATING DOCUMENTS WITH USER-RELATED INFORMATION

BACKGROUND

Social networks are used by online users to share information with people and other entities. The social network user can typically choose who to share the information with, sometimes broadcasting the information across all connections, or limiting the sharing a desired set of contacts. Further, the social network user can provide a plurality of information that is stored by the social network, such as the user's identification, contact information, updates, comments, images, documents, activities, and as much or as little else as may be desired. These social networks are becoming increasingly important and popular, and are changing the way people share information with others. The sharing and collaborative creation of information in the form of typical common business-type documents (e.g., word processing, spreadsheets, presentation documents, etc.) is not used by social networks, however, and the traditional behavior of emailing document files is instead the dominant form of sharing of such content.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

There is an abundance of data stored by social networks that may be relevant to certain types of documents, but there is not a simple way to import the data from the social network into a document using existing tools. For example, when a user creates a document that comprises their name, contact information, and/or other relevant information (e.g., education and employment for a resume) they usually have to retrieve the information from a source, and enter it into a document template or one created from scratch.

Currently, a user may create a document template that comprises relevant information, and use this template to generate the desired document. However, the document is limited to merely that template, and if the relevant information changes the template is no longer useful, and/or the user may have to re-enter the information. Further, there are no current tools that allow the user to import relevant data over a variety of document templates, for example, where the type of data is constant, but the actual information may change (e.g., the user's contact related information, images, documents, etc.).

Accordingly, one or more techniques and/or systems are disclosed that allow users to generate documents of various types that are pre-populated with data pulled from their social networks. For example, the data might include items from their profile, friends' profiles, groups they are part of etc. After document creation and, perhaps, edits by the user, the document might be shared with other users via private messaging, published social network stream entry, and/or uploaded to a cloud-based storage that provides access to the user's contacts, such as for collaboration and/or interaction with the document, for example.

As an example, starting from a document template that contains text, formatting, graphics, formulas etc., relevant data can be imported on behalf of a user from a social network, such as by using one or more application programming interfaces (APIs). The data can be used to populate various fields in the template, resulting in creation of a new pre-populated document. Optionally, for example, the user may utilize typical editing tools to further customize the document, and then share the document with other users of the social network.

In one embodiment, for generating a document pre-populated with user-based information, user-based information can be added to a document template at locations of one or more information identifiers in the document template to generate the pre-populated document. The user-based information added to the template can correspond to the one or more information identifiers, and is retrieved from a user-authorized social network.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for creating a document from a template that is pre-populated with information a user may normally need to add to the document, such as contact information, user profile information, background information, and/or other details that are not typically included in a template, and/or may change periodically. For example, one or more of the user's social networks can be mined for user-based information, and the mined information can be populated into the template to provide the pre-populated document. Further, as an example, the pre-populated document may be shared with the user's one or more social networks, such as by sharing (e.g., messaging, posting, sharing in newsfeed) a link to the document or uploading it to the social network.

Figure 1:
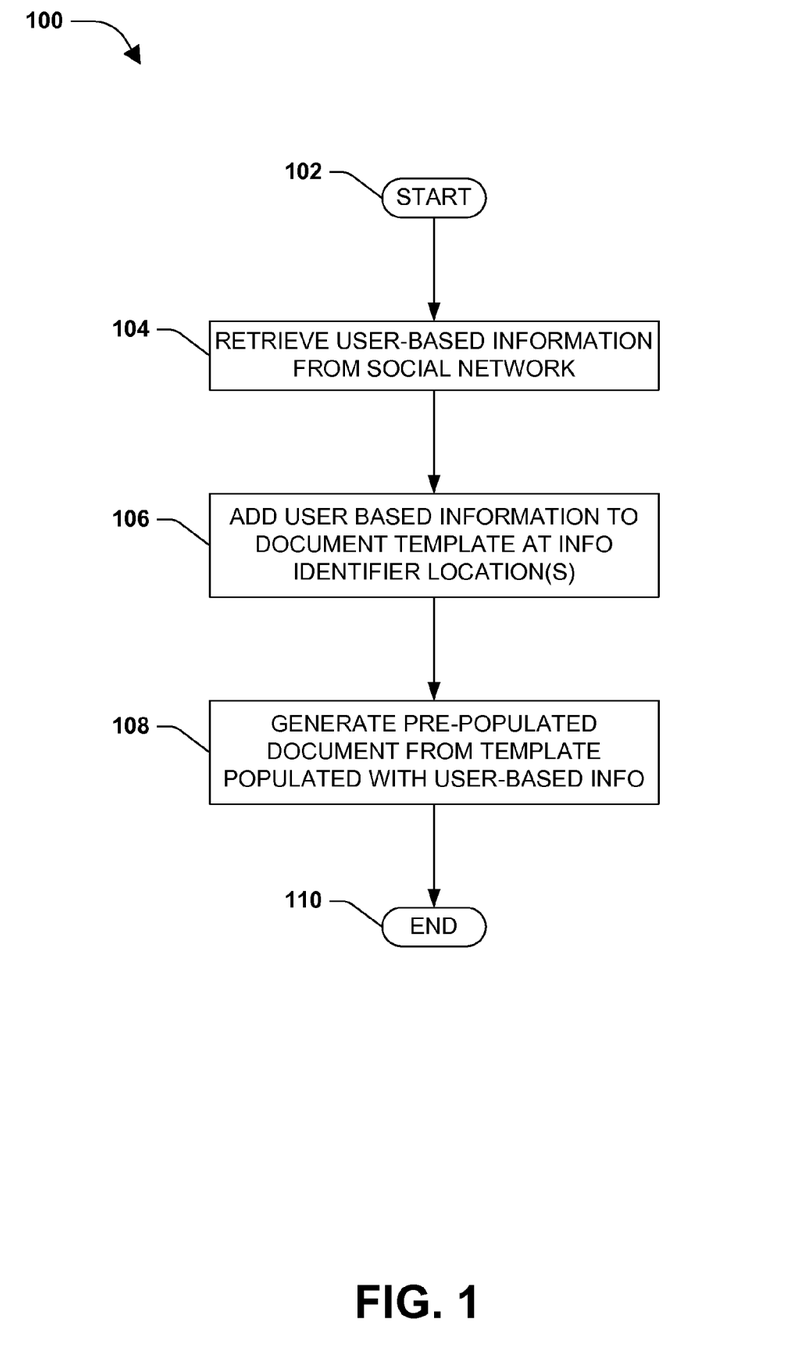
FIG. 1 is a flow diagram of an exemplary method for generating a document pre-populated with user-based information.

FIG. 1 is a flow diagram of an exemplary method 100 for generating a document pre-populated with user-based information. The exemplary method 100 begins at 102 and involves retrieving the user-based information from a user-authorized social network, at 104, where the user-based information corresponds to one or more information identifiers in a document template. The user-based information is added to the document template at a location of the one or more information identifiers, at 106. The pre-populated document is generated, at 108, using the document template that is populated with the user-based information. Having generated the pre-populated document, the exemplary method 100 ends at 110.

As an example, an abundance of user-related data may be stored by one or more social networks of a user. Often, a user's social network may comprise the user's name, contact information (e.g., email, phone number, instant message contact, address, etc.), education history, employment history, images, documents, and other relevant information that the user may upload, as well as similar information for the user's social network contacts, and/or groups with which they may be associated. This information may be accessed, for example, and automatically (e.g., programmatically) plugged into a document template that comprises indicators corresponding to the relevant information.

As an illustrative example, a document template can be created, such as a resume template for a word processing application. A resume typically includes the user's name, contact information, education history, and employment history. In this example, the document template can comprise information indicators at locations where the relevant information may be typically found in a document. An example name information indicator may be: <firstname> <lastname>; and an example address information indicator may be: <streetaddress>, <city>, <state>, <zipcode>. In this example, these indicators can be found at the locations in the template, such as document fields, where a user may typically insert this information in the document, such as the resume.

Further, in this illustrative example, the information that corresponds to the information indicators can be retrieved from one or more of the user's social networks, such as those that have been authorized by the user for collection of such information. An authorized social network may be mined for the information that corresponds to the indicators in the template, and retrieved, for example. The retrieved user-related information can then be filled into the appropriate fields in the template, and the pre-populated document is generated, for example, where the pre-populated resume has the user's name and contact information, as well as their education and employment history in the appropriate locations in the document, for example. As an illustrative example, the user may provide additional edits to the documents and publish it as needed.

Figure 2:
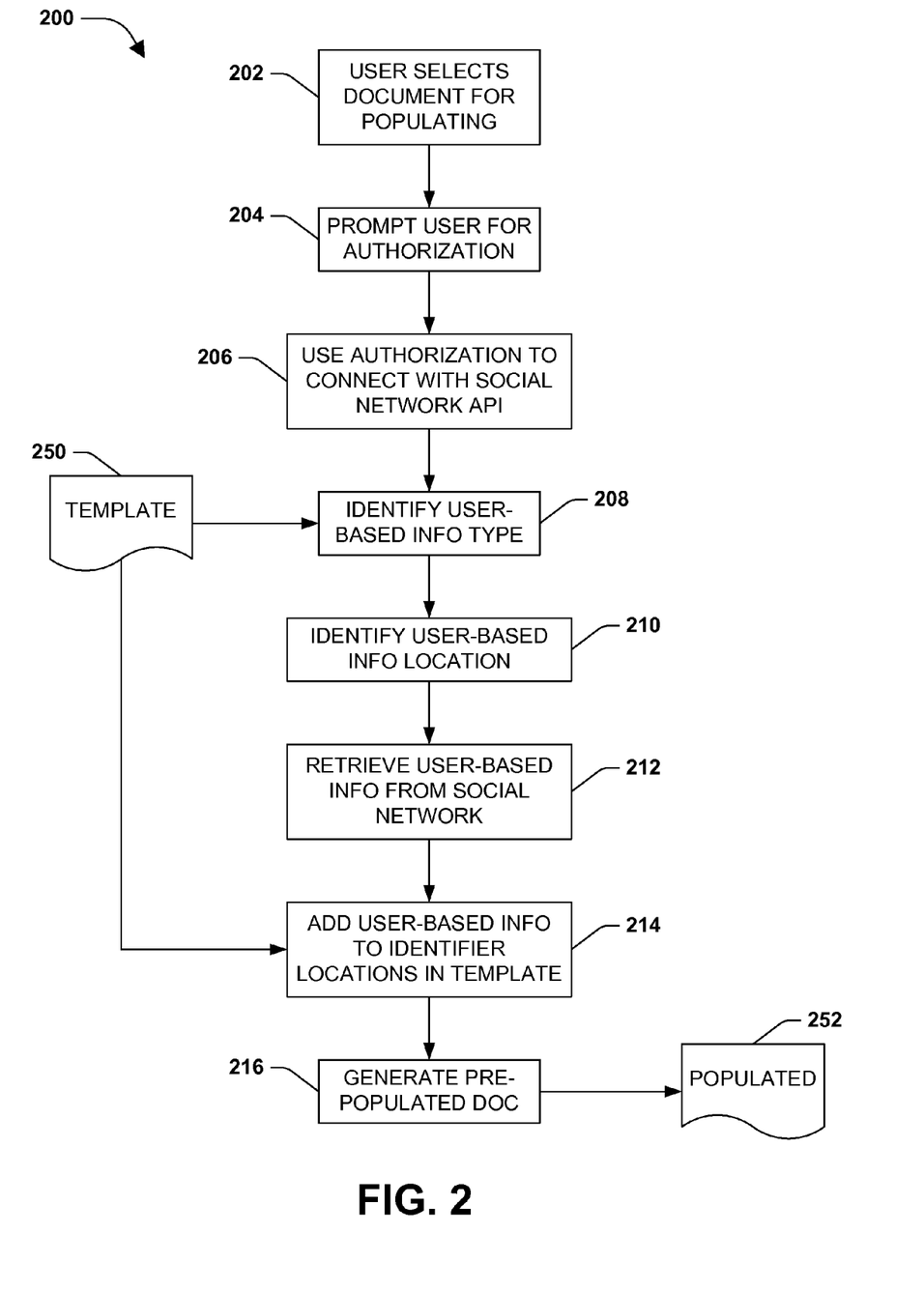
FIG. 2 is a flow diagram of an example embodiment where one or more portions of a method for generating a document pre-populated with user-based information are implemented.

FIG. 2 is a flow diagram of an example embodiment 200 where one or more portions of a method for generating a document pre-populated with user-based information are implemented. At 202, a user selects a document (e.g., a base document template) they may wish to have pre-populated with user-related information, such as one that is often found in a document processing suite of applications. For example, the user may wish to create a spreadsheet comprising the user's contacts, and the contacts' profile information.

At 204, the user can be prompted to provide authorization information for accessing the social network. For example, when a user accesses a social network, the site hosting the social network typically prompts the user to provide a login authorization (e.g., username and password; unless the login information is saved on the user's client machine). In one embodiment, the user can provide the authorization information so that the social network site can be contacted and accessed on behalf of the user.

At 206, the authorization information can be used to connect with the user-authorized social network, such as by accessing an application programming interface (API) used to interface with the social network. For example, a client machine used by the user for generating the document can be connected to the Internet, and this connection may be used (e.g., by an application that generates the document) to connect with the API to interface with the social network. As another example, a remote service (e.g., remote to a user's client machine, providing document services) may be connected to the Internet and use this connection to interact with the social network.

At 208, a type of user-based information can be identified. For example, a document template 250 can comprise information identifiers, which are associated with corresponding user-based information. In one embodiment, the information identifiers in the document template 250 can be used to facilitate identification of the corresponding user-related information in the user-authorized social network. As an example, an information identifier <userprofileimage> may correspond to an image that the user uploaded to the social network for use as their profile image. In this example, the user-based information type can comprise an image, and may further comprise the user's profile image.

In one embodiment, the information identifier may comprise an extension that can facilitate identification of the user-based information type. For example, the information identifier <userprofileimage.jpg> comprises the extension "jpg," which corresponds to a JPEG image file. As an illustrative example, user-based information may comprise images, text, formatting, graphics, programming code, and/or other types of information that may be inserted into a template to generate a pre-populated document, where information of an image may be chosen for insertion into a template, for example, where an image related identifier, such as "jpg" is identified, for example.

In one embodiment, the interface API may be used to facilitate identifying the user-based information type. As an example, the interface API can use the information identifier to identify a corresponding user-based information type on the user-authorized social network. At 210, a location of the corresponding user-based information can be identified on the user-authorized social network. In one embodiment, the interface API may be used to find the location for the corresponding user-based information.

At 212, the appropriate user-based information can be retrieved from the user-authorized social network. In one embodiment, retrieving the user-based information can comprise pulling the user-based information from the user authorized social network. For example, the user-based information can be pulled from an identified location on the social network, such as a remote storage server associated with the social network, using the interface API. In another embodiment, the retrieving the user-based information can comprise requesting the user-based information from the user authorized social network, such as by sending a request to, or using, the interface API. In this embodiment, the user-based information can be received from the user authorized social network in response to the request.

At 214, the user-based information retrieved from the social network can be added to the document template 250. In one embodiment, adding the user-based information to the document template can comprise filling a section of the document template tagged by the information identifier with the user-based information. For example, the information identifier can tag or mark a field in the document template that can be filled by the user-based information. As an illustrative example, a field where a user may insert their education history may be tagged by an identifier <eductionhistory>. Similarly, a profile image of the use may be inserted at a location tagged by an identifier <userprofileimage.jpg>

At 216, the pre-populated document 252 can be generated using the user-based information filled into the document template, such as filled into the fields marked or tagged by the information identifiers. The resulting pre-populated document 252 can comprise a format that the user can edit, and/or publish, for example. In one embodiment, the pre-populated document can be generated in a format that provides for interacting with the pre-populated document online without a client side application specific to the document format. For example, the user may generate the document in a format that uses a specific application, which may not be available to other users interested in viewing and/or collaborating on the document. In this embodiment, for example, a platform agnostic format may be provided, such as using a web-based document platform, that allows other users to view and/or collaborate on the document without having to load the specific application onto their respective client devices.

Figure 3:
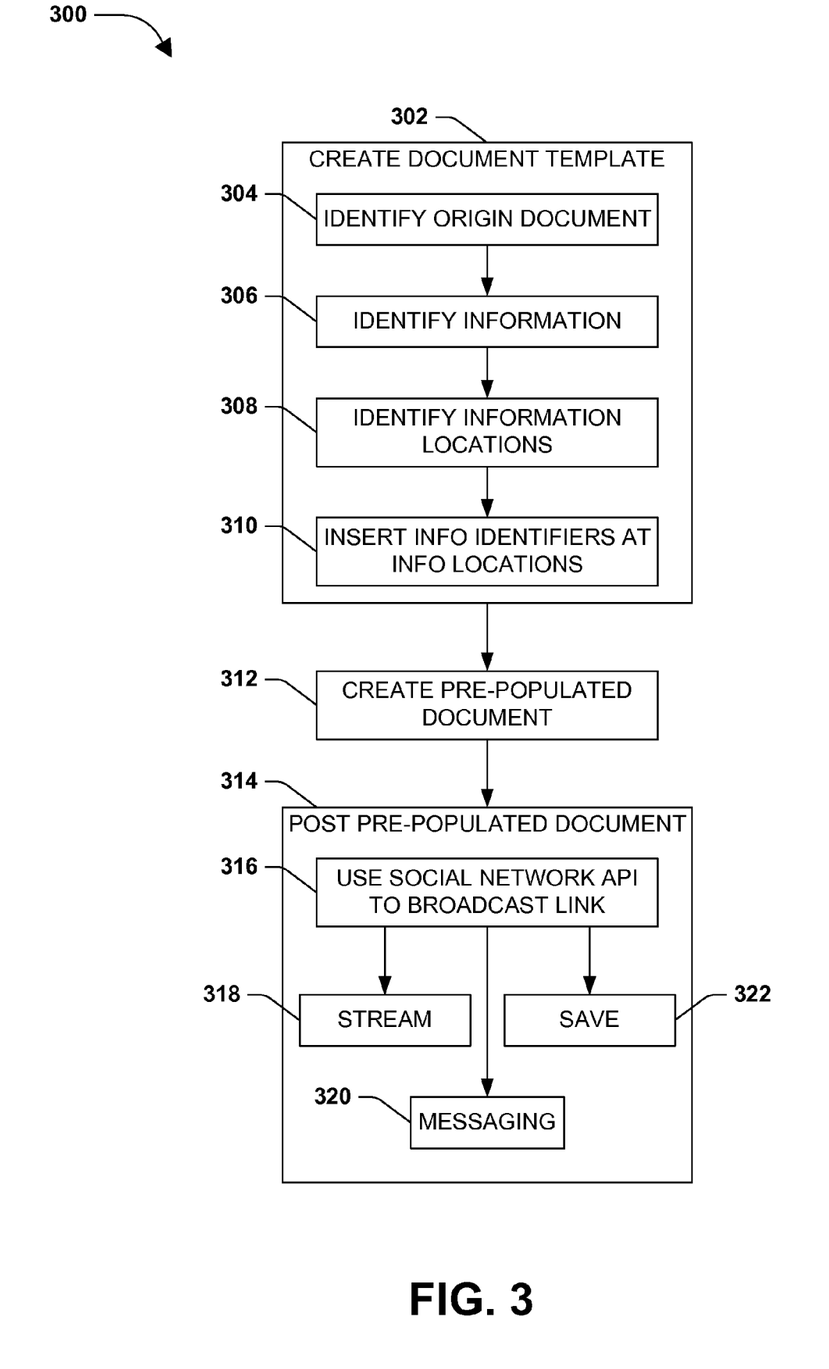
FIG. 3 is a flow diagram illustrating an example embodiment where one or more techniques described herein may be implemented.

FIG. 3 is a flow diagram illustrating an example embodiment 300 where one or more techniques described herein may be implemented. At 302, a document template can be created that may be utilized when generating a document pre-populated with user-based information. Creating the document template can comprise identifying an origin document, at 304. An origin document may comprise a document type, for example, that a user wishes to populate with information from their social network. For example, the origin document may be a resume template, a letter template, a spreadsheet template for contact information, a presentation of images with comments template, a form template, etc. In one embodiment, the origin document may reside locally on the user's client machine. In another embodiment, the origin document may reside remotely on a server operated by a service provider.

At 306, creating the document template can comprise identifying information in the origin document that may be used for populating with the user-related information. For example, the origin document can comprise fields that may be filled in with specific user-related information, such as name, address, etc. In this example, the fields in the origin document can be identified. At 308, the location of the information fields can be identified in the origin document, and information identifiers can be inserted at the identified locations in the origin document at 310.

At 312, the pre-populated document can be created, as described above, using the document template. In this example embodiment 300, at 314, the pre-populated document can be posted, such as by the user. In one embodiment, the pre-populated document can be posted to the user authorized social network. Posting the pre-populated document can comprise using a social network application programming interface (API) to broadcast a link, for example, to the pre-populated document over the social network, at 316. In this way, for example, the pre-populated document may be delivered to a desired audience (e.g., connections, other users, etc) using the social network.

Figure 4:
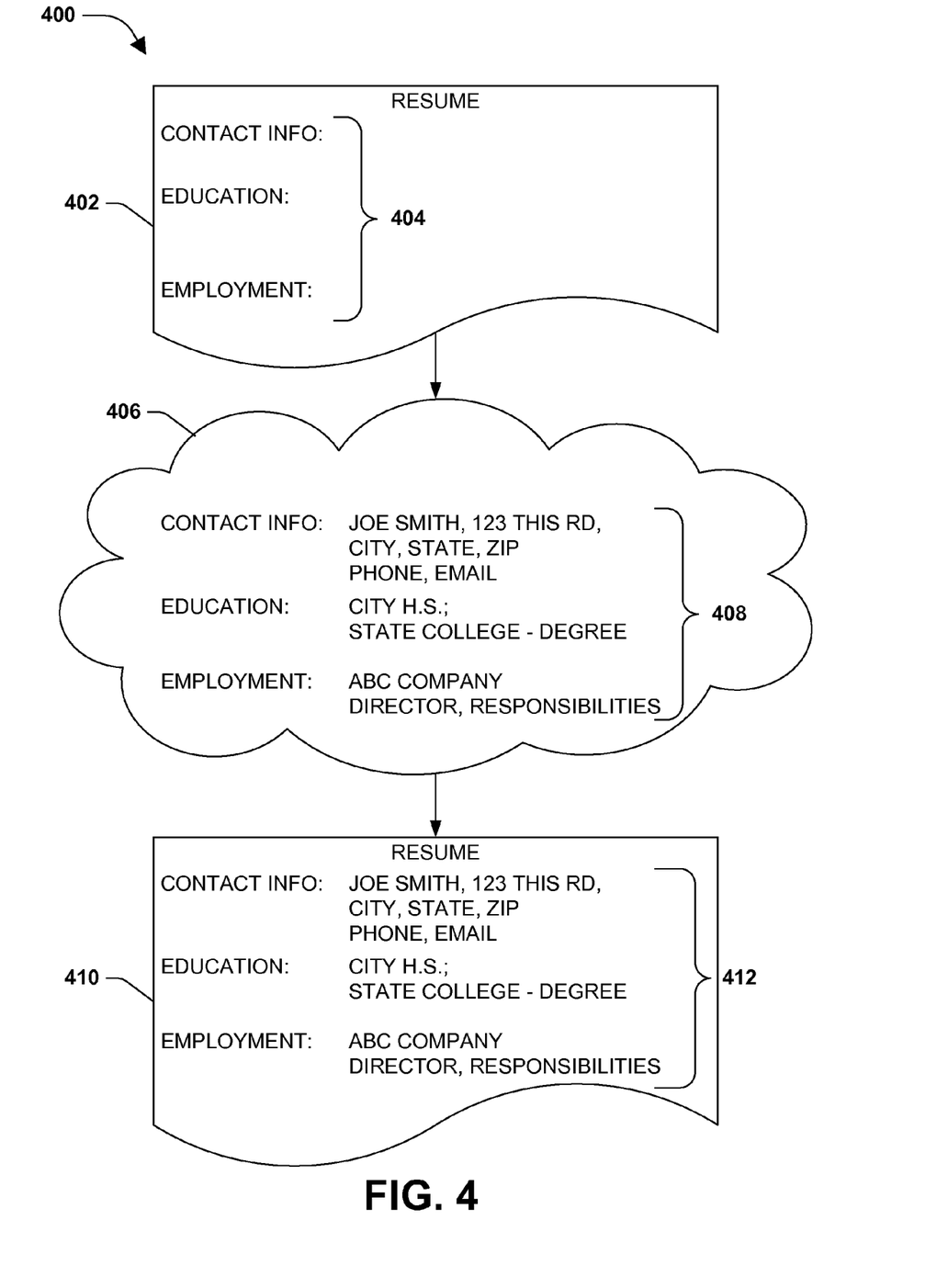
FIG. 4 illustrates an example embodiment where one or more techniques described herein may be implemented.

As an illustrative example, in an example embodiment 400 of FIG. 4, a document template 402 can be created, such as for a resume. In this example 400, the document template comprises information fields 404 tagged with respective information identifiers (contact info, education, and employment). Further, the user-authorized social network 406 may be mined for the corresponding user-related information 408, and the pre-populated document 410 can be created. In this example, the pre-populated document 410 comprises the user-related information 408 populated in the information fields 412 at the corresponding locations.

In one embodiment, the API may be used to post to a user's stream in the social network, at 318. For example, social networks typically allow a user to update their status, and/or provide commentary on something of interest to the user. In this example, the user may select the pre-populated document for sharing in the user's stream of the social network, such as a newsfeed or blog. In another embodiment, the API may be used for messaging to one or more connections in the user authorized social network, where a message comprises a link to the pre-populated document, at 320. As an example, a message can be created that comprises a link to the pre-populated document, and the user can send the message to one or more desired contacts.

In another embodiment, the user can post the pre-populated document by making the document accessible to one or more connections in the user-authorized social network, at 322. For example, the user may upload the pre-populated document to a cloud-based server. In this example, some social networks allow for users to make the saved document accessible to other users, such as by authorizing desired users to view, and/or interact with a shared directory or folder comprising the file. In this way, for example, the user is able to provide the pre-populated document to as many other users as they wish (e.g., on the user's client, and/or a remote server).

In one embodiment, when generating the pre-populated document, the document can be created in a format that provides for interacting with the pre-populated document online without a client side application specific to the document format. For example, as described above, the pre-populated document can be posted for interaction by desired users. However, not all of the desired users may have an application available on their client that allows for interaction with the document (e.g., a particular word processing application). In this embodiment, for example, the pre-populated document can be posted to an Internet-based service that allows users to view and interact with the document without having the supporting application resident on their machines (e.g., a web-based word processing service).

A system may be devised for pre-populating document with user desired information that may not be included in a template document. User-related information may be mined from one or more of the user's social networks, and the mined information can be populated into the template to provide the pre-populated document, for example, using such a system. Further, as an example, the system may be used to share the pre-populated one or more of the user's social network contacts, such as by sharing (e.g., messaging, posting, sharing in newsfeed) a link to the document and/or uploading it to the social network.

Figure 5:
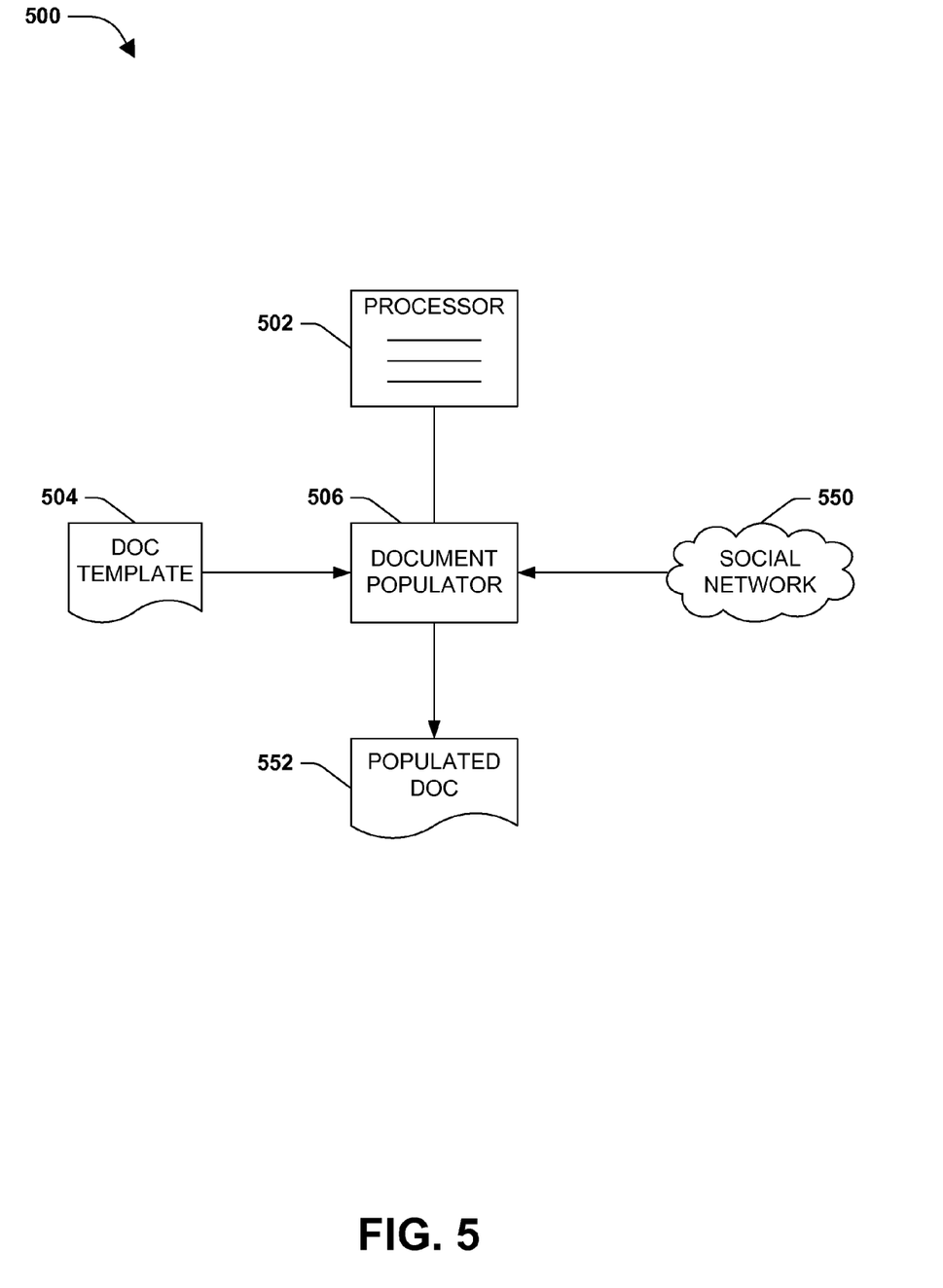
FIG. 5 is a component diagram of an exemplary system for generating a document pre-populated with user-based information.

FIG. 5 is a component diagram of an exemplary system 500 for generating a document pre-populated with user-based information. A computer-based processor 502 is configured to process data for the system. A document template 504 comprises one or more information identifiers that are associated with user-based information from a user-authorized social network 550. The document template 504 can be populated with the user-based information from the user authorized social network 550 at one or more information identifiers. The processor 502 is operably coupled with a document population component 506. The document population component 506 is also operably coupled with the document template 504, in order to populate the document template 504 with the user-based information from the user authorized social network 550 at the one or more information identifiers.

Figure 6:
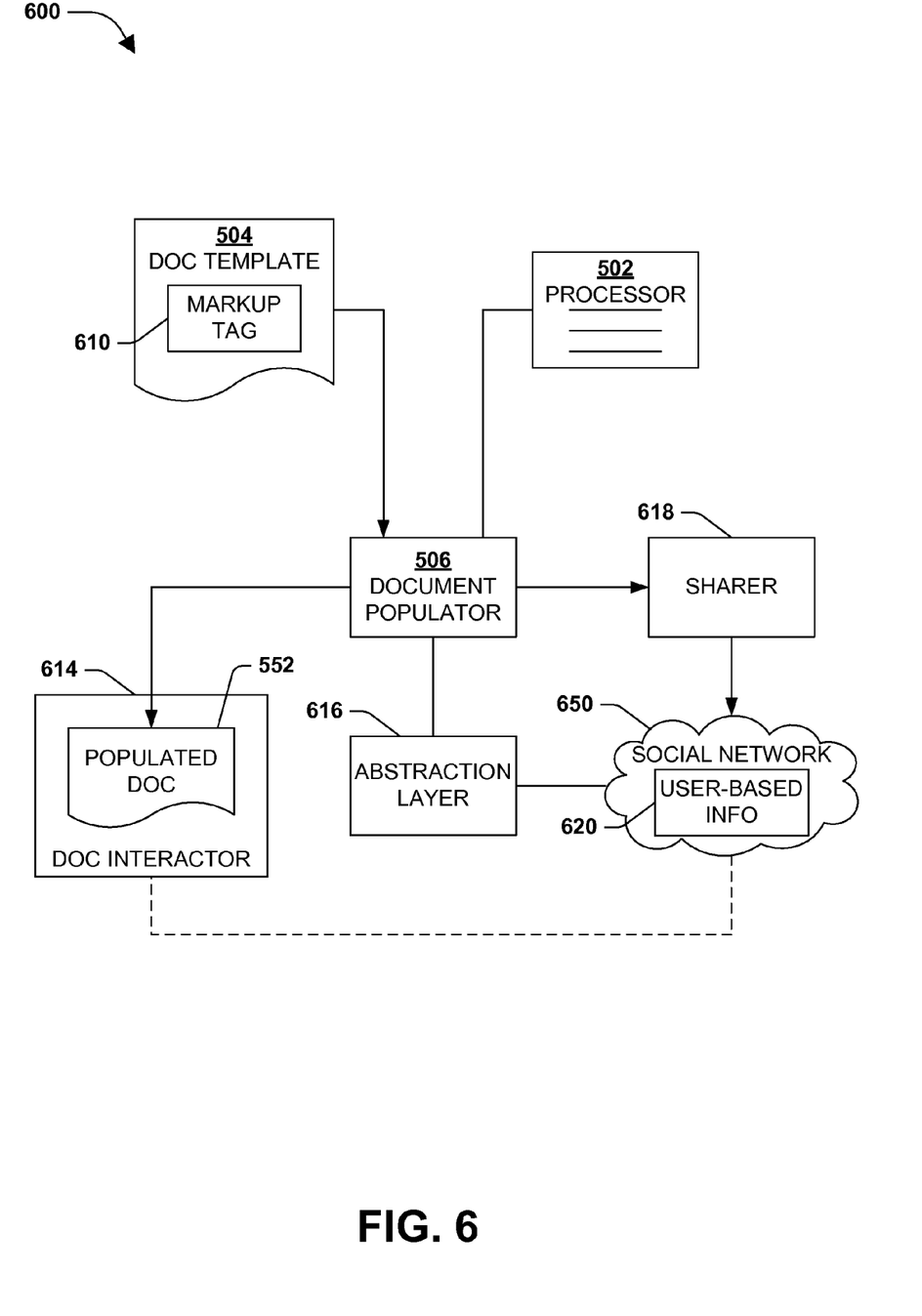
FIG. 6 is a component diagram illustrating an example embodiment where one or more systems described herein may be implemented.

FIG. 6 is a component diagram illustrating an example embodiment 600 where one or more systems described herein may be implemented. In one embodiment, a user-authorized social network 650 comprises user-based information 620. The user-based information can comprise user-related identification information (e.g., user and or other contact's name, username, other identifiers, etc.); user-related contact information (e.g., user and or other contact's address, phone number(s), email address, instant message contact, etc.); user-related employment information (e.g., user and or other contact's employment history, etc.); user-related education information (e.g., user and or other contact's education history, etc.); user-related profile information (e.g., user and or other contact's interests, user details, etc.); user-related activity information (e.g., user and or other contact's activities one the social network, updates, etc.); a user-related document (e.g., user and or other contact's document uploaded to the social network or made available using the social network, etc.); a user-related image (e.g., user and or other contact's images loaded to the social network, etc.); and/or a user-related comment (e.g., user and or other contact's comments on items or posted to the social network, etc.) as well as any other user-based information.

In one embodiment, the document (e.g., the document template 504, and/or the pre-populated document 552) can comprise a word processor-based document; a spreadsheet-based document; a presentation-based document; an image editor-based document; a form-based document; an organizer application-based document; and an email-based document. Further, in one embodiment, the document template can comprise an open extensible markup language format (e.g., open XML), and the information identifiers can comprise a markup tag 610. The markup tag may identify a location in the template to populate with the user-based information, and identify the user-based information (e.g., an information field for filling with the user-related information).

In the example embodiment 600, an abstraction layer component 616 can be used to interface the system 600 with the user-authorized social network 650. For example, the abstraction layer component 616 can comprise an application programming interface (API) provided for interacting with the social network. Further, the abstraction layer component 616 can be used to identify a location of the user-based information on the user-authorized social network, and identify a type of user-based information on the user-authorized social network. For example, the API may be able to match the type of information called for by the markup tags 610 in the document template, and find the location of the corresponding user-based information 620 in the social network 650.

A document interaction component 614 can provide a client agnostic platform for interacting with the pre-populated document 652 online. For example, the client agnostic platform may comprise an online service that allows the user's connections to view and or interact with the pre-populated document 652 without having to load a document specific support application to their client machine. A sharing component 618 can interact with the user-authorized social network 650 to broadcast an access to the pre-populated document 652 over the user-authorized social network 650. For example, the sharing component 618 can provide a link to the pre-populated document 652 in a user's social network stream, message, and/or upload.

Figure 7:
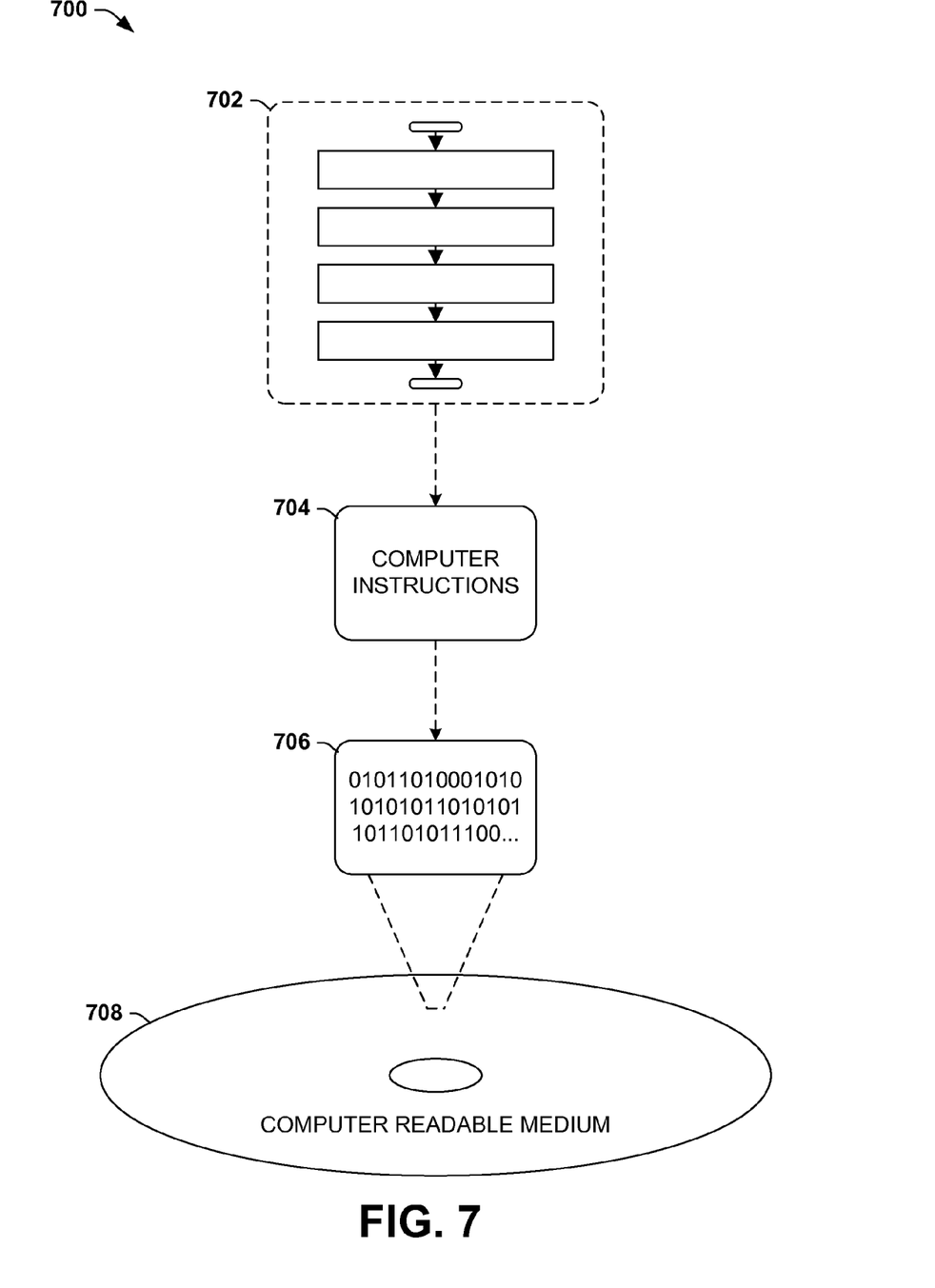
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
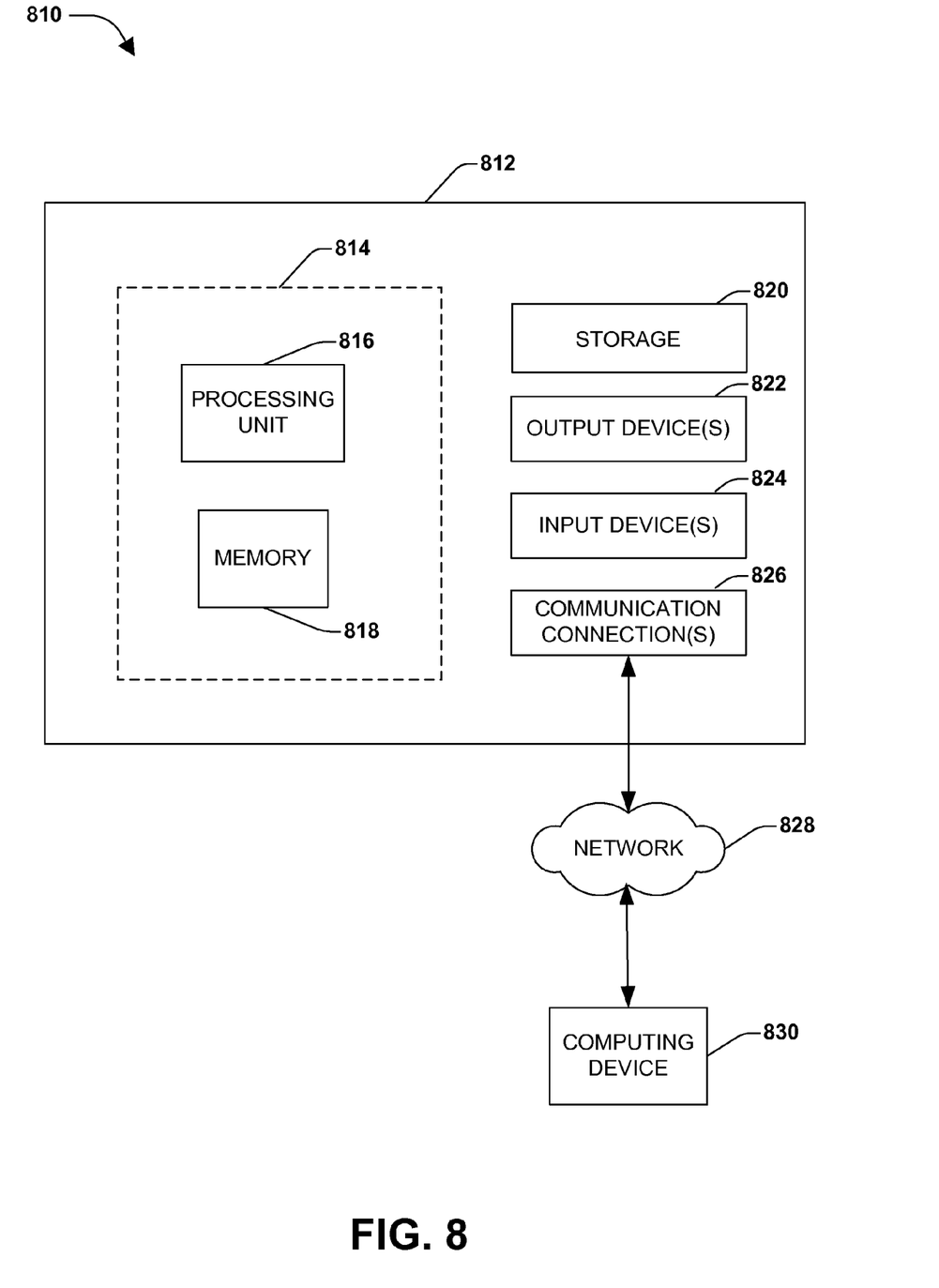
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
    searching a document template created using a document template creation application to identify a set of information identifiers comprised in the document template, the set of information identifiers comprising an information identifier disposed at a location within the document template;
    receiving authorization information for connecting to a social network;
    accessing an application programming interface (API);
    connecting to the social network by providing the authorization information to the social network using the API;
    identifying, in a profile of a user of a social network, user-based information corresponding to the information identifier using the API;
    responsive to the identifying, retrieving the user-based information from the social network using the API;
    responsive to the retrieving, adding the user-based information to the document template at the location within the document template; and
    creating a document comprising the user-based information added to the document template using a document creation application distinct from the document template creation application;
    wherein the document comprises a platform agnostic format that allows collaboration on the document without use of the document creation application.

2. The method of claim 1, comprising posting the document to the social network using the API.

3. The method of claim 2, the posting comprising one or more of:
    posting the document to a user stream in the social network;
    messaging the document to one or more connections in the social network; or
    making the document accessible to one or more connections in the social network.

4. The method of claim 2, further comprising broadcasting a link to the document over the social network using the API.

5. The method of claim 1, the information identifier specifying a data type and the identifying comprising:
    searching the profile to identify the user-based information based upon the user-based information being of the data type specified by the information identifier.

6. The method of claim 1, the document comprising a resume.

7. The method of claim 1, comprising accessing the document template using the API.

8. The method of claim 1, comprising generating the document in a format that provides for interacting with the document online without a client side application specific to the format.

9. The method of claim 1, the adding comprising filling a section of the document template with the user-based information.

10. A system, comprising:
    one or more processing units; and
    memory comprising instructions that when executed by at least one of the one or more processing units, perform operations comprising:
        searching a document template created using a document template creation application to identify a set of information identifiers comprised in a document template, the set of information identifiers comprising an information identifier disposed at a location within the document template;
        receiving authorization information for connecting to a social network;
        accessing an application programming interface (API);
        connecting to the social network by providing the authorization information to the social network using the API;
        identifying, in a profile of a user of a social network, user-based information corresponding to the information identifier;
        responsive to the identifying, retrieving the user-based information from the social network using the API without retrieving, from the social network, other user-based information that does not correspond to at least one of the one or more information identifiers;
        responsive to the retrieving, adding the user-based information to the document template at a location of the information identifier; and
        creating a document comprising the user-based information added to the document template using a document creation application distinct from the document template creation application;

wherein the document comprises a platform agnostic format that allows collaboration on the document without use of the document creation application.

11. The system of claim 10, the user-based information comprising one or more of:
   user-related identification information;
   user-related contact information;
   user-related employment information;
   user-related education information;
   user-related profile information;
   user-related activity information;
   a user-related document;
   a user-related image; or
   a user-related comment.

12. The system of claim 10, the document comprising one of:
   a word processor-based document;
   a spreadsheet-based document;
   a presentation-based document;
   an image editor-based document;
   a form-based document;
   an organizer application-based document; or
   an email-based document.

13. The system of claim 10, the document template comprising an open extensible markup language format.

14. The system of claim 10, the information identifier comprising a markup tag.

15. The system of claim 10, the operations comprising one or more of:
   interfacing the system with the social network; or
   identifying a type of user-based information on the social network.

16. The system of claim 10, the operations comprising providing a client agnostic platform for interacting with the document.

17. The system of claim 10, the operations comprising interacting with the social network to broadcast access to the document over the social network.

18. A computer readable device comprising instructions that when executed perform a method, comprising:
   searching a document template created using a document template creation application to identify a set of information identifiers comprised in the document template, the set of information identifiers comprising an information identifier disposed at a location within the document template;
   receiving authorization information for connecting to a social network;
   accessing an application programming interface (API);
   connecting to the social network by providing the authorization information to the social network using the API;
   identifying user-based information corresponding to the information identifier using the API;
   responsive to the identifying, retrieving the user-based information from a social network using the API; and
   responsive to the retrieving, adding the user-based information to the document template at the location of the information identifier within the document template; and
   creating a document comprising the user-based information added to the document template using a document creation application distinct from the document template creation application;
   wherein the document comprises a platform agnostic format that allows collaboration on the document without use of the document creation application.

* * * * *